United States Patent [19]

Frigano

[11] 4,241,511
[45] Dec. 30, 1980

[54] METHOD AND APPARATUS FOR DETERMINING AND RECORDING BOAT COMPASS DEVIATION

[76] Inventor: Michael J. Frigano, 66-23 Fresh Pond Rd., Ridgewood, N.Y. 11227

[21] Appl. No.: 18,608

[22] Filed: Mar. 8, 1979

[51] Int. Cl.³ .................... G01C 21/22; G01C 17/10
[52] U.S. Cl. ........................................ 33/272; 33/274
[58] Field of Search .................. 33/272, 275 R, 274

[56] References Cited

U.S. PATENT DOCUMENTS

| 1,615,507 | 1/1927 | Fisher | 33/274 |
| 1,949,422 | 3/1934 | Karnes | 33/274 |
| 2,015,627 | 9/1935 | Hug | 33/274 |
| 2,099,772 | 11/1937 | Seidelhuber | 33/274 |

FOREIGN PATENT DOCUMENTS

| 299180 | 10/1928 | United Kingdom | 33/272 |
| 1043785 | 9/1966 | United Kingdom | 33/274 |

*Primary Examiner*—William D. Martin, Jr.

[57] ABSTRACT

A method and apparatus for determining and recording boat compass deviation which includes a novel apparatus which may be oriented with respect to either a line of sight bearing or a compass reading and includes means for recording at predetermined annular increments the difference between the boat's compass heading and the magnetic heading of the vessel.

3 Claims, 3 Drawing Figures

U.S. Patent   Dec. 30, 1980   4,241,511
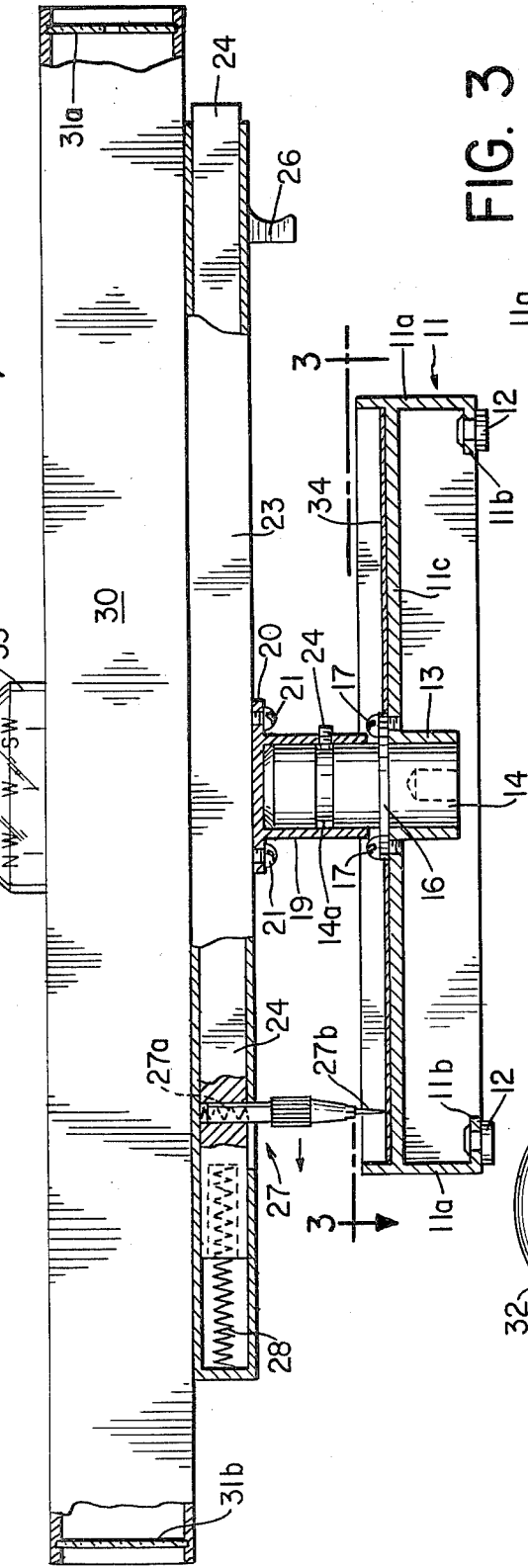
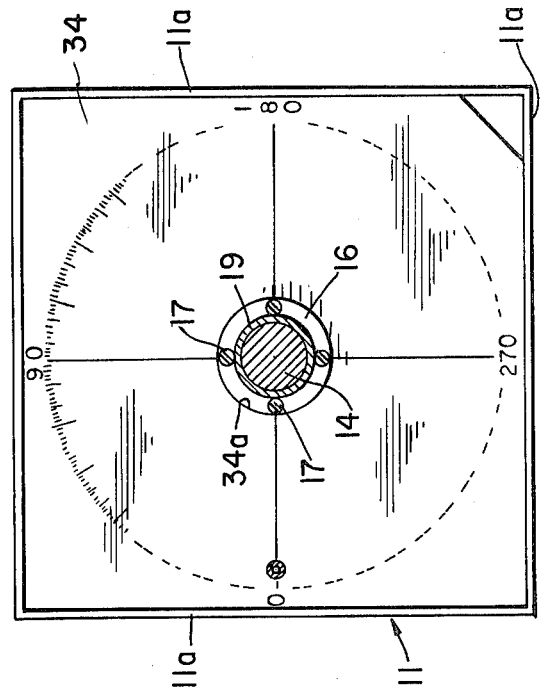
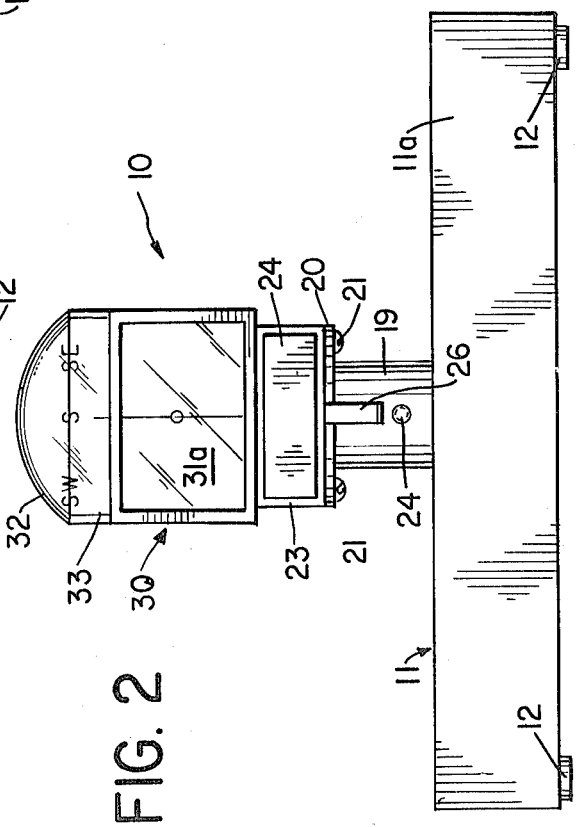

METHOD AND APPARATUS FOR DETERMINING AND RECORDING BOAT COMPASS DEVIATION

BACKGROUND OF THE INVENTION

The present invention is concerned with shipboard compass errors specifically with respect to correcting for deviation. Deviation is the error in the compass induced by ferrous objects or electro-magnetic or magnetic fields near the compass. It is distinguished from the departure from a true heading known as variation, which is the difference between geographic north and magnetic north (in the Northern Hemisphere) and the difference between geographic south and magnetic south (in the Southern Hemisphere).

Compass deviation is the result of magnetic interference in the vicinity of the compass, which can be caused for example by a steel centerboard or keel, the engine if not too far away, with its large mass which might be partially magnetized, and by electric motors, radio loud speakers or electric wires carrying current in close proximity to a compass.

In order to adjust a compass for deviation, the majority of small boat compasses have compensators built into the compass assembly. These are small magnets that can be rotated by means of shafts or gear segments to set up magnetic fields opposing local magnetic disturbances, thus cancelling the original cause of deviation. There are situations, however, which make total compensation for deviation extremely difficult if not impossible; for example, the deviation may be so great that compensators cannot take care of the entire amount. In such cases, the creation of a deviation chart is the only practical approach.

It may also happen that a boat owner has never gone through the laborious and time-consuming procedure of compensating the vessel's compass. He may assume that such compensation has occurred previously if he bought his boat from a previous owner, or he may simply have avoided or delayed taking this step. Under these circumstances, the boat owner may wish to take a trip of some distance and have the assurance his compass readings are accurate, or if not accurate, know the deviation quickly and easily. It is in the latter circumstance that the device of the present invention becomes extremely valuable.

Variation error can be eliminated by plotting a course according to magnetic headings; however, on a long trip, especially where bad weather may occur and where visibility becomes poor, it is extremely important to know the deviation for different compass readings.

The apparatus and method of the present invention is directed toward the creation of an accurate deviation chart in the circumstances described above.

SUMMARY OF THE INVENTION

In accordance with the present invention, a compass deviation recording device useful to determine such deviation aboard a vessel comprises a base adapted to receive a compass card having degree indicia thereon equidistantly arranged from a central perpendicular axis, a recorder gun housing mounted for rotary movement about said axis above said card in parallel relationship to said card, a stylus depending from a recorder gun housing such that the tip of the stylus rests upon the card approximately in the vicinity of the indicia, means carried by the recorder gun housing for orienting said housing with respect to a predetermined heading and means for moving said stylus radially upon said card whereby as said recorder gun is maintained in fixed relationship with respect to said heading and said base and card are revolved therebeneath, said stylus may be moved intermittently at selected degree increments to record the deviation between said heading and a compass heading separate therefrom. The device of the invention includes two separate means carried by the recorder gun housing for orienting the housing with respect to a predetermined heading. One such means is a compass and the other is a sight tube. Each of these respective orienting means lends itself to a separate method of determining compass deviation which shall be described more particularly in the specification.

BRIEF DESCRIPTION OF THE DRAWING

FIG. 1 is a side elevation, partially in cross section, of a device constructed in accordance with the principles of the present invention for recording deviation on a compass card while a boat is turned through 360 degrees;

FIG. 2 is an end view of the device of FIG. 1; and

FIG. 3 is a plan view taken in the direction of arrows 3—3 of FIG. 1.

DESCRIPTION OF A PARTICULAR EMBODIMENT

Referring to the drawing, a deviation recording device 10 constructed according to the present invention has been illustrated. Device 10 includes a square mounting base 11 having side walls 11a and internal flanges 11b at right angles with respect to each side wall 11a. Flanges 11b are supported upon a series of rubber pads 12 which are adapted to rest upon any horizontal surface such as for example a forward deck surface. Alternatively, the base 11 can be mounted upon a tripod (not shown) which can be set up vertically upon the forward deck or some other appropriate position.

In the center or axis of the base 11 is a depending cylindrical section 13 in which is a stub shaft 14. The latter is held or is fixed with respect to the section 13 by a collar 16 attached to a horizontal section 11c of the housing by screws 17. Resting upon the upper end of shaft 14 is a tubular member 19. Tubular member 19 is attached by flange 20 and screws 21 to the undersurface of a recording gun housing 23. Tubular member 19 is rotatable about shaft 14 and is prevented from movement upwardly relative thereto by set screw 22 which rides in groove 14a of the shaft 14.

Recorder gun housing 23 with fingergrip 26 has a generally rectangular outer shell in which a plunger 24 is located for reciprocal movement. The forward end of plunger 24 is connected to a stylus 27. The latter is a hollow tube having an internal spring 27a which exerts downward pressure against a pencil or pen point 27b. Spring 28 within housing 23 urges plunger 24 to the right as viewed in FIG. 1. Thumb pressure moves it to the left. Immediately above the recorder gun housing and attached thereto is a sight tube 30, of generally rectangular cross section containing at one end a vertical cross hair 31b. At the other end is an eyepiece with a peephole 31a. Mounted above the sight tube 30 is a conventional liquid filled compass 32 having therein an inverted cup compass card 33.

A compass rose card 34 is adapted to be placed upon horizontal partition or section 11c of the base 11, having been provided with a circular opening 34a therein to fit about collar 16. Thus, when plunger 24 is pressed to the left as viewed in FIG. 1, plunger 24 will cause stylus 27 to move in the direction of the arrow causing a radial mark to be recorded on the compass rose card 34. When the pressure is released, spring 28 will cause plunger 24 and the stylus to snap back or return quickly into the position shown. The card 34 will be placed such that 0°-180° thereon will be aligned with one horizontal axis of support base 11. This axis (the forward/aft axis) may be marked for convenience on the base. In locating the recording device 10 on the vessel it shall be necessary to know where the lubber line of the vessel is located, which is a line running from the bow to the center of the stern. After setting up the device 10 with the forward-/aft axis in parallel relationship to the lubber line, three methods of recording compass deviation are possible using the device of the present invention. These methods shall be described separately as follows:

First Method: Let us assume that the compass of the device 10 is of good quality and will provide accurate readings of magnetic headings. In order for this to be as such, two prerequisites have to satisfied. First, the device 10 must be made of a non-ferrous material in order not to introduce a deviational error into the compass reading. Alternatively, such deviation, if any, can be compensated out as mentioned earlier. Second, the device 10 must be positioned aboard the vessel such that it is not subject to, or is at least substantially free, from those magnetic influences which affect the boat's compass. Since such magnetic disturbances decrease inversely as the square of the distance from an object producing magnetic interference, it is suggested that the device 10 be mounted upon the forward deck, preferably upon a tripod before using the device to produce a deviation card.

When the device 10 has been so positioned, one horizontal axis of the base 11 should be oriented with the north/south axis parallel to the ship's lubber line, that is parallel to a line bisecting the vessel from bow to stern. The boat's compass will have been similarly oriented. Next, the recorder gun housing 23 will be rotated relative to base 11 so that the sight tube 30 and compass 32 are aligned with the fore and aft axis of base 11. The helmsman will then cause the boat to seek a heading of 0° according to the boat's compass, and while holding this heading, the operator of the device 10 will rotate the recorder gun housing 23 until the compass 32 also reads 0°. The plunger 24 is then moved rapidly forwardly by and quickly released to record the difference, i.e. compass deviation upon card 34. For this method, the card 34 will indicate degrees 0°-360° increasing in a counter-clockwise direction. Next, the helmsman will turn the vessel in a slow turn throughout 360° to the right or left while the operator of the device 10 maintains (by using compass 32) the recorder gun housing at the original heading (0°). This causes the base 11 to be rotated with respect to the recorder gun housing. The helmsman calls out "mark" in increments of 15° and the operator of the device 10 will quickly cause plunger 24 to be reciprocated at each increment to mark the card 34. Upon completion of the 360° turn, the card 34 will contain readings indicating compass deviation and the respective compass headings, from which a deviation card may be prepared.

Second Method: In using the second method, the device 10 may be positioned (one axis of base 11 being parallel to the lubber line) anywhere on the vessel regardless of magnetic interference (since compass 32 will not be used). The use of this method is conceptually similar to Method 1, except that a nonmagnetic range is used instead of a compass heading. As with the first method, the card 34 will indicate degrees 0°-360° increasing in the counterclockwise direction. The sight will first be locked into the magnetic range, and the vessel will be turned to align the sight tube with the lubber line of the vessel. The reading on the card 34 aligned with the sight tube will correspond with the heading of the magnetic range. As with the first method, the vessel will next be turned through 360° (while the sight tube is maintained or locked into the magnetic range). The helmsman will call out say 15° or 10° increments for his reading of the vessels compass, and at each increment the operator will push plunger 24 rapidly forward to record such increment. A deviation card can readily be prepared by noting the difference between the incremental readings of the boat's compass and the degree heading recorded by movement of plunger 24.

Third Method: The third method differs from Method 1 and 2 by recording on the card 34 (which will have increasing degree increments in clockwise order) relative bearings (a bearing relative to the boat's compass) at increments of 15°. As with the first method, the vessel will be turned through 360° with an initial compass heading say, of 0°. The operator maintains sight tube 30 aimed on a distant fixed object (smoke stack, tower, etc.) and pushes plunger 24 each time the helmsman calls out "mark", which he may do at 10° or 15° increments until a full 360° turn has been made. Card 34 is then removed from base 11 and each recorded degree mark is converted mathematically to compass bearings. For example, compass heading 100° plus relative bearing 030° equals a compass bearing of 130°. The resulting compass bearings are compared to the actual magnetic bearing of the fixed object to obtain the deviation for each 10° or 15° of the boat's heading.

If the distant object is shown on a nautical chart, its magnetic bearing can be measured. If the distant object is not charted, its magnetic bearing may be taken as the mean or average of all the resulting compass bearings. If a vessel circles within a small area, the bearings of a fixed object six miles or more away will not change materially during the 360° turn.

The advantage of the third method is that the operator of the device of the invention can be on a strange boat in any location without a nautical chart, and by simply aiming the device at a distant object unknown to him, he can make a deviation chart rapidly and accurately.

It will be understood that the foregoing description has been of particular embodiments of the invention and is therefore representative. In order to appreciate fully the scope of the invention, reference should be made to the appended claims.

I claim:

1. A compass deviation recording device comprising a base adapted to receive a compass rose card having degree indicia thereon equidistantly arranged from a central perpendicular axis therethrough, a recorder gun housing mounted for rotary movement about said axis above said card and in parallel relationship to said card, said recorder gun housing including a plunger reciprocally movable therein, a stylus carried by said plunger and depending from said recorder gun housing such that the tip of said stylus rests upon the card approximately in the vicinity of said indicia, means for resiliently urging said stylus toward and into contact with said card, means connected to said plunger at the end thereof opposite to said stylus to permit rapid reciprocal movement of said plunger and said stylus, a spring within said recorder gun housing for urging said plunger in one direction to return said plunger to its initial position after having been moved reciprocally in the opposite direction and means carried by the recorder gun housing for orienting said housing with respect to a predetermined heading.

2. The recording device according to claim 1 wherein the orienting means carried by the recorder gun housing is a compass.

3. The recording device according to claim 1 wherein the orienting means carried by the recorder gun is a sight tube.

* * * * *